Figure 1:
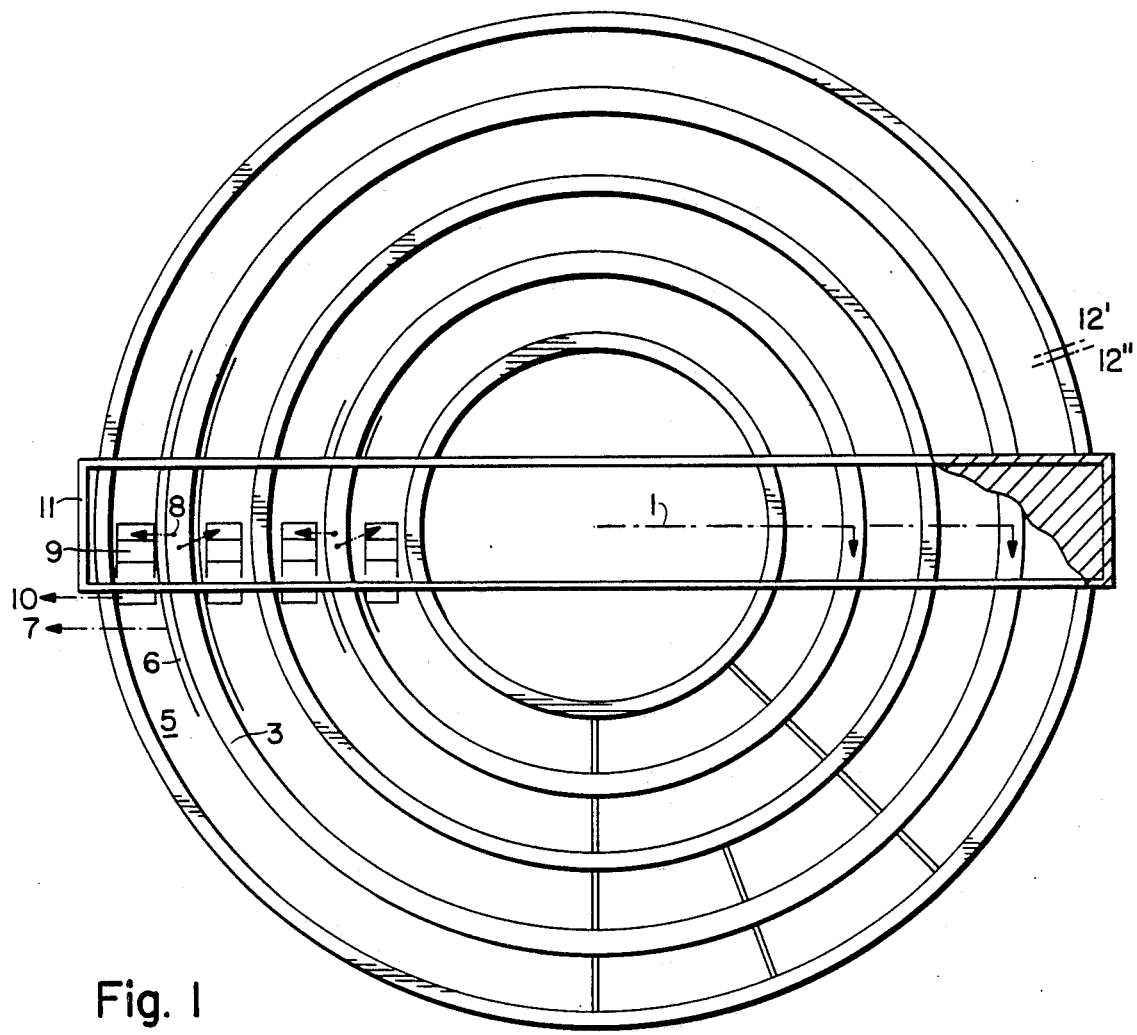

United States Patent [19]

Franzén

[11] Patent Number: 4,655,908
[45] Date of Patent: Apr. 7, 1987

[54] DEVICE FOR CLEANING LIQUIDS IN SAND FILTERS

[75] Inventor: Gillis Franzén, Trångsund, Sweden

[73] Assignee: Stubinen Utreckling AB, Stockholm, Sweden

[21] Appl. No.: 774,739

[22] Filed: Sep. 11, 1985

[51] Int. Cl.$^4$ .................................. B01D 23/24
[52] U.S. Cl. ........................ 210/87; 210/90; 210/270; 210/272; 210/273
[58] Field of Search ............. 210/264, 269, 272, 273, 210/280, 284, 87, 90, 270

[56] References Cited

U.S. PATENT DOCUMENTS

| | | | |
|---|---|---|---|
| 2,086,829 | 7/1937 | Streander | 210/272 |
| 2,339,084 | 1/1944 | Lose | 210/272 |
| 2,715,964 | 8/1955 | Martin | 210/272 |
| 4,482,457 | 11/1984 | Jacquet | 210/270 |

Primary Examiner—Ivars Cintins

[57] ABSTRACT

The present invention relates to a device for cleaning of liquids in sand filters of the up-stream type. The device according to the invention is characterized in that a sand filter bed (5) is arranged in the form of at least one ring-shaped element, which possibly is arranged on either side of a feeder channel (3) in which the devices (8) are suspended in a rotating continuously travelling bridge (11) for take-up of sand, which is arranged to be cleaned in a multi-stage cleaning device (9) and returned to the upper surface of the sand filter bed (5), which is applied in order to smooth out the sand by means of a scraper device (13) which is incorporated in the bridge (11) which possibly is multi-armed and then equipped which several take-up devices (8) of which some are designed as scrapers or flushing nozzles (13) in addition to which introduction of the liquid for filtration is arranged from a chamber (1) via feeder pipes (2' and 2") or via a separate feed-in line (1) directly or via the feeder channel (3) to the distribution troughs (4', 4", 4''') in the sand bed (5) where the clean water is collected via a trough (6) and discharged via an outlet (7) in connection with which perforated probes (12' and 12") are inserted in the sand filter bed (5) to monitor circulation and cleaning.

4 Claims, 2 Drawing Figures

U.S. Patent    Apr. 7, 1987    4,655,908

DEVICE FOR CLEANING LIQUIDS IN SAND FILTERS

The present invention relates to a device for cleaning liquids in up-stream sand filters.

The filtering of liquids in rapid sand filters is known in, as a rule, water suspension, either from above and down as in down-stream filters or from below and up as in up-stream filters. In most cases, the filter is cleaned by washing it from below and up by means of momentary surging, what is known as backwashing, one or more times every day. Different types of continuous flushing filters already exist such as, for instance, the Dynasand filter according to Swedish Pat. No. 396.552, the Carex filter according to the Swedish patent application for publication 430.126 or the multi-celled thin-layer filter. The two former types of filter are up-stream filters and can be used as "contact filters" in which flocculation chemicals are added immediately upstream of the filter and flocculation takes place in the lower section of the filter. The Dynasand filter is equipped with a permanent air lift pump which takes up sand from the bottom. After being washed in the air lift, the sand is returned to the top of the bed of sand. The rectangular Carex filter is fitted with an air lift pump which is suspended in a cart and runs back and forward in the feeder channel. The sand from the bottom of the filter bed is conducted into the feeder channel and taken up by the air lift after which it is returned following cleaning in a screw conveyor to the top of the bed of sand. These known filters are technically complex and relatively expensive to operate.

The purpose of the present invention is to bring about a filter design which does not incorporate these drawbacks but which instead is simple and inexpensive.

The device according to the invention is characterized by that which is presented in the appended patent claims.

Figure 2:
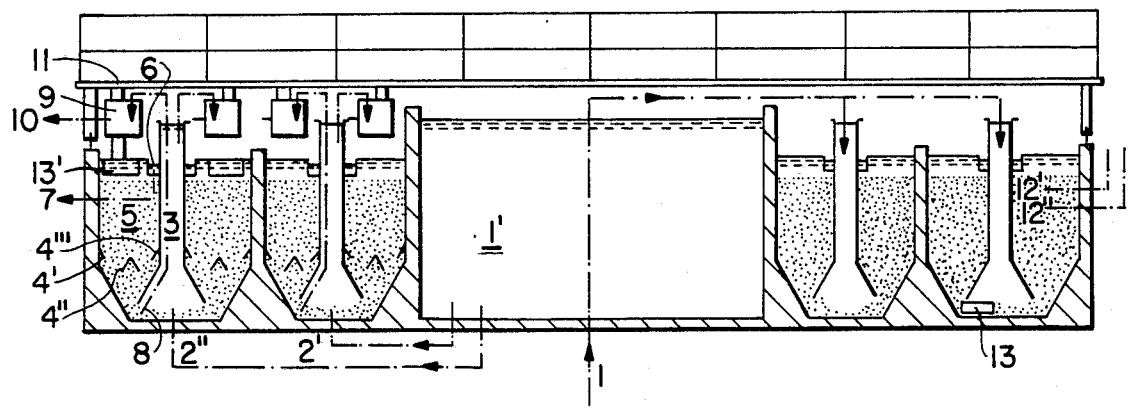

The invention will now be described in more detail referring to the appended drawing in which FIG. 1 depicts a device as seen from above and
FIG. 2 depicts the same device as seen from the side.

FIGS. 1 and 2 depicts an arrangement of an extremely simple filter primarily for larger facilities in which the feeder channels 3 are circular in design and the sand filter beds or sand beds 5 are designed in the shape of one or more ring-shaped elements (concentric rings) on either side of the respective feeder channel 3. An air lift pump or other type of take-up device 8, which is suspended in a rotating bridge 11, can then continuously travel around and take up sand which is cleaned in a multi-stage cleaning device 9 and returned to the upper surface of the bed of sand 5. The respective sand beds 5 can easily be smoothed out by means of the scraper unit 13', incorporated in the bridge 11. The rotating bridge 11 can be designed with several arms and equipped with a number of take-up devices 8. Some of these take-up devices 8 can be replaced by scrapers or flushing nozzles 13. The cleaned water is collected in each respective sand bed via a trough 6 and discharged via an outlet 7.

The liquid to be filtered can be fed directly or via a feeder channel 3 to the distribution troughs 4', 4", 4''' etc. in each respective sand bed 5 from a chamber 1 by means of feeder pipes 2' and 2" or via a separate inlet line 1, where the liquid is fed horizontally for powering the bridge 11 by means of the reactionary force of the jet.

To ensure that each respective sand bed 5 is vertically circulated and cleans uniformly, perforated probes 12', 12" are inserted in the sand bed 5 at regular intervals vertically and horizontally. These probes permit either manual or automatic monitoring of the pressure and flow distribution.

It is also possible to utilize the device for biological purification of various types of waste water in which principally, coarser sand is used.

For aerobic cleaning, air or oxygen is introduced in each respective sand bed. The flushing water is sometimes circulated and discharged via an outlet 10.

In anaerobic cleaning, the sand may be taken up by means of an elevator, screw conveyer or suction. If air lifts are used for anaerobic cleaning, biogas is introduced. The entire facility must in that case be enclosed and separated from the ambient air.

For biological cleaning, other forms of sand bed 5 can be used. Also, it is conceivable that materials other than sand could be used.

The invention is naturally not confined to this design and it can obviously be varied within the bounds of the concept of the invention.

I claim:

1. Up-stream sand filter for deep filtration of liquids to clean the liquids comprising a feeder channel (3), a sand filter bed (5) in the form of at least one ring-shaped element arranged on either side of said feeder channel, a continuously rotating travelling bridge (11), devices (8) suspended in said bridge for the take-up of sand, multi-stage cleaning devices (9) for cleaning the sand taken up by said suspended devices (8) and returning the cleaned sand to upper surfaces of said sand filter beds, a scraper unit (13') for smoothing out a respective sand filter bed incorporated in the bridge, a chamber (1) from which liquid to be filtered is introduced into said sand filter beds, means for feeding liquid to be filtered from said chamber directly or via the feeder channel to each respective sand filter bed, distribution troughs (4',4",4''') in each respective sand filter bed to which liquid to be filtered is fed by said feeding means, a trough (6) in each respective sand filter bed for collecting clean water, an outlet (7) in each respective sand filter bed for discharging clean water, and perforated probes (12'12") inserted in each respective sand filter bed to monitor circulation and cleaning of the liquid.

2. An up-stream sand filter according to claim 1, wherein the rotating bridge (11) has a plurality of arms some of which carry flushing nozzles (13).

3. An up-stream sand filter according to claim 1, wherein said feeding means comprise feeder pipes (2',2").

4. An up-stream sand filter according to claim 1, wherein said feeding means comprise a separate feed-in line (1) from said chamber.

* * * * *